United States Patent
Durbha et al.

(10) Patent No.: US 9,268,922 B2
(45) Date of Patent: Feb. 23, 2016

(54) REGISTRATION OF DEVICES IN A DIGITAL RIGHTS MANAGEMENT ENVIRONMENT

(71) Applicant: Cable Television Laboratories, Inc., Louisville, CO (US)

(72) Inventors: Seetharama Rao Durbha, Louisville, CO (US); Clarke Stevens, Littleton, CO (US)

(73) Assignee: CABLE TELEVISION LABORATORIES, INC., Louisville, CO (US)

( * ) Notice: Subject to any disclaimer, the term of this patent is extended or adjusted under 35 U.S.C. 154(b) by 0 days.

(21) Appl. No.: 14/270,742

(22) Filed: May 6, 2014

(65) Prior Publication Data
US 2015/0324554 A1 Nov. 12, 2015

(51) Int. Cl.
G06F 7/04 (2006.01)
G06F 17/30 (2006.01)
G06F 21/10 (2013.01)

(52) U.S. Cl.
CPC .................................. *G06F 21/105* (2013.01)

(58) Field of Classification Search
CPC .................................................... G06F 21/105
USPC ............................................................ 726/26
See application file for complete search history.

(56) References Cited

U.S. PATENT DOCUMENTS

| | | | |
|---|---|---|---|
| 8,407,803 B2 | 3/2013 | Alve | |
| 2004/0019801 A1* | 1/2004 | Lindholm et al. | 713/200 |
| 2004/0205333 A1* | 10/2004 | Bjorkengren | 713/153 |
| 2005/0044397 A1* | 2/2005 | Bjorkengren | 713/200 |
| 2005/0198693 A1* | 9/2005 | Choi et al. | 726/26 |
| 2005/0278787 A1* | 12/2005 | Naslund et al. | 726/26 |
| 2010/0333209 A1* | 12/2010 | Alve | 726/26 |
| 2013/0167253 A1* | 6/2013 | Seleznev et al. | 726/29 |

OTHER PUBLICATIONS

Joan Feigenbaum; Privacy Engineering for Digital Rights Management Systems; year:2007; Yale University; p. 1-30.*

* cited by examiner

*Primary Examiner* — Monjour Rahim
(74) *Attorney, Agent, or Firm* — Duft Bornsen & Fettig

(57) ABSTRACT

Methods and structure for Digital Rights Management (DRM) are provided. An exemplary system includes a Digital Rights Management (DRM) licensing server. The DRM licensing server is able to receive authentication information generated by a DRM module of a client device, and to receive a device identifier that uniquely distinguishes the client device from other client devices, wherein the device identifier has been generated by the DRM module. The DRM licensing server is further able to authenticate the DRM module based on the authentication information, to create a signed identifier based on the device identifier responsive to authenticating the DRM module, and to transmit the signed identifier to the client device. The system also includes an application server able to register the client device with an account at the application server, based on the signed identifier.

20 Claims, 6 Drawing Sheets

REGISTRATION OF DEVICES IN A DIGITAL RIGHTS MANAGEMENT ENVIRONMENT

FIELD OF THE INVENTION

The invention relates generally to Digital Rights Management (DRM).

BACKGROUND

Providers of audiovisual content may control how that content is accessed by end users in order to enhance value and security. Ideally, providers wish to grant access to content by authorized users, while preventing access to content by unauthorized users. However, unauthorized users sometimes steal the credentials of authorized users in order to gain access to the content of a provider. For example, an authorized user's credentials may be stolen by a third party. This third party may then enter the stolen credentials on their own device without the user's knowledge in order to gain access to the content.

SUMMARY

Systems and methods herein provide for device-specific registration techniques that allow a user account to be associated with a specific device (or set of devices). In this manner, when the user's credentials are entered on an unauthorized device, access can be denied.

One exemplary embodiment is a system that includes a Digital Rights Management (DRM) licensing server. The DRM licensing server is able to receive authentication information generated by a DRM module of a client device, and to receive a device identifier that uniquely distinguishes the client device from other client devices, wherein the device identifier has been generated by the DRM module. The DRM licensing server is further able to authenticate the DRM module based on the authentication information, to create a signed identifier based on the device identifier responsive to authenticating the DRM module, and to transmit the signed identifier to the client device. The system also includes an application server able to register the client device with an account at the application server, based on the signed identifier.

Other exemplary embodiments (e.g., methods and computer readable media relating to the foregoing embodiments) are also described below.

BRIEF DESCRIPTION OF THE FIGURES

Some embodiments of the present invention are now described, by way of example only, and with reference to the accompanying figures. The same reference number represents the same element or the same type of element on all figures.

DETAILED DESCRIPTION OF THE FIGURES

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
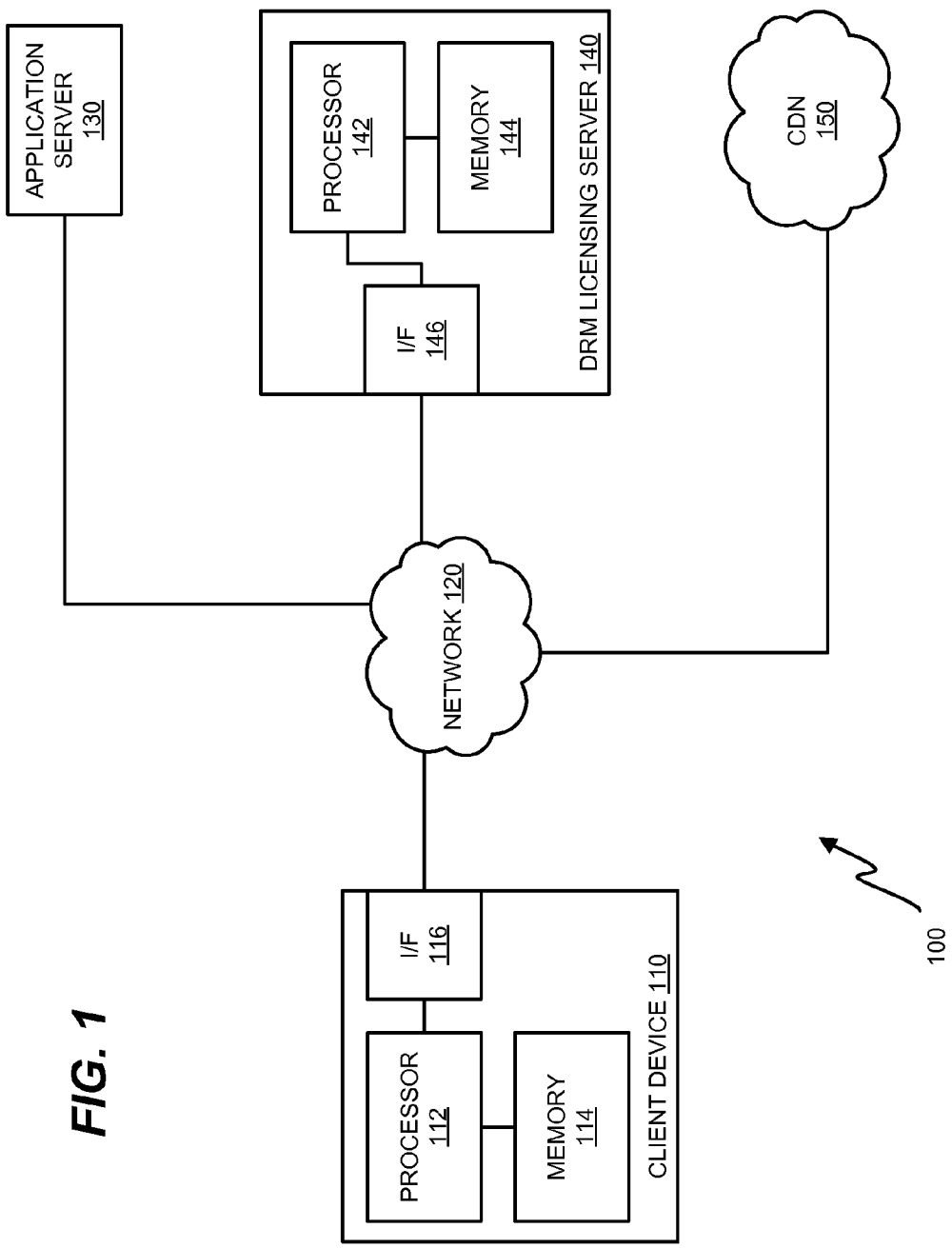
FIG. 1 is a block diagram of an exemplary network architecture.

FIG. 1 is a block diagram of an exemplary network architecture 100 where a client device 110 registers with an account at application server 130 (e.g., to enable client device 110 access to media content such as movies, music, television shows, games, etc. from CDN 150). In the network architecture 100 of FIG. 1, multiple client devices attempt to register with accounts at application server 130. However, only one client device (client device 110) is shown in FIG. 1 for the sake of clarity.

In many content delivery systems, credentials-based authorization techniques are vulnerable because a user's account name and password can be stolen. The stolen user name and password can then be entered by a third party to access content without the user's approval. To combat this pressing issue, the network architecture 100 of FIG. 1 implements device-specific authorization techniques that associate user accounts with a limited universe of authorized devices. In this manner, even if valid user credentials are provided to application server 130 by an unauthorized device, the unauthorized device can be denied access to an account at application server 130.

In order to authorize individual devices in a secure manner, the network architecture 100 of FIG. 1 utilizes DRM licensing server 140. DRM licensing server 140 operates in conjunction with a DRM module on client device 110 (shown in FIG. 2) to securely register client device 110 as an authorized device. Once client device 110 has been authorized/registered, it is allowed to access the associated account on application server 130 (e.g., whenever valid credentials are provided to application server 130, or whenever client device 110 provides a specially signed device identifier (ID) to application server 130).

Client device 110 comprises any suitable combination of systems and/or components capable of interacting with application server 130 (e.g., in order to acquire content from CDN 150). For example, client device 110 may comprise a set-top box, a tablet, a media console, a cellular phone, etc., running an application for interacting with application server 130. As shown in FIG. 1, client 110 includes processor 112, memory 114, and interface (I/F) 116. Processor 112 and memory 114 comprise hardware components (e.g., circuitry) capable of performing stored instructions to implement programs such as operating systems, internet browsers, "apps," etc. In this embodiment, processor 112 and memory 114 implement a DRM module for authenticating client device 110 with DRM server 140. I/F 116 comprises a hardware component operable to communicate with other devices via network 120. I/F 116 may be wired or wireless depending on the specific nature of client device 110.

Network 120 carries communications between client device 110, application server 130, DRM licensing server 140, and/or CDN 150. Network 120 may comprise any suitable network, such as the Internet, a Wireless Local Area Network (WLAN), a Radio Access Network (RAN) capable of handling cellular communications, or the like.

The DRM module of client device 110 is capable of generating a device identifier (ID) and transmitting it via network 120 to DRM licensing server 140. Generating the device ID at the DRM module generally ensures that the device ID is valid and has not been tampered with. The DRM module itself may be generated, signed, and/or provided to client 110 by a trusted device within network architecture 100 in order to ensure that the DRM module is a trusted component. For example, the DRM module may be provided by DRM licensing server 140, application server 130, etc. In one embodiment, the DRM module comprises embedded software/firmware at client device 110 that exists in a compiled format or is otherwise inaccessible for manipulation by the end user.

Since the DRM module is a secure component of client device 110 that is safe from tampering by a user, the DRM module should be resistant against malicious use. Furthermore, DRM licensing server 140 is capable of authenticating the DRM module to confirm that it has not been tampered with. Thus, once the DRM module has been authenticated, its device ID can be reliably trusted to uniquely identify/distinguish client device 110 from other client devices that access application server 130. Once the DRM module has been authenticated, DRM licensing server 140 is capable of signing the device ID, and is further capable of sending the signed device ID (aka "signed ID") to client device 110, which sends the signed device ID to application server 130 in order to register client device 110 with an account at application server 130. Alternatively, DRM licensing server 140 may send the signed device ID directly to application server 130 in order to register client device 110.

In this embodiment, DRM licensing server 140 includes processor 142, memory 144, and interface (I/F) 146. Processor 142 and memory 144 comprise hardware components (e.g., circuitry) capable of performing stored instructions to implement services, programs, etc. I/F 146 comprises a hardware component operable to communicate with other devices via network 120.

Once client device 110 has been registered at application server 130 and is ready to utilize an account, it sends a copy of the signed device ID to application server 130 (e.g., in order to use the account to retrieve content from CDN 150). Application server 130 accesses its memory when receiving the signed device ID from client device 110, and verifies that the signature of the signed device ID belongs to DRM licensing server 140 (e.g., by comparing the signature to an internally stored digital certificate originally created by DRM licensing server 140). If the signature of the signed device ID is verified as belonging to DRM licensing server 140, application server 130 checks the device ID against a list of authorized device IDs for each user account (e.g., as stored in memory). Application server 130 can then recognize client device 110 as an authorized device, and can enable access to the appropriate account (e.g., in order to direct CDN 150 to provide content to client device 110 after the user enters login credentials). In one embodiment, even if the signature is verified as belonging to DRM licensing server 140, application server 130 may still determine that client device 110 is not an authorized device (e.g., if stolen credentials are detected by application server 130).

CDN 150 comprises a distributed set of network-connected servers that provide media content to end-users, for example via a streaming protocol. Servers of CDN 150 respond to instructions from application 130 in order to provide content to users.

The particular arrangement, number, and configuration of components described herein is exemplary and non-limiting. For example, application server 130 need not direct the actions of a CDN, but may rather be used for a two-factor authentication processes, may be used for banking applications to limit funds transfers to authorized devices, or may generally be used for any conceivable purpose, including those where the delivery of content to users is not the end goal.

Figure 2:
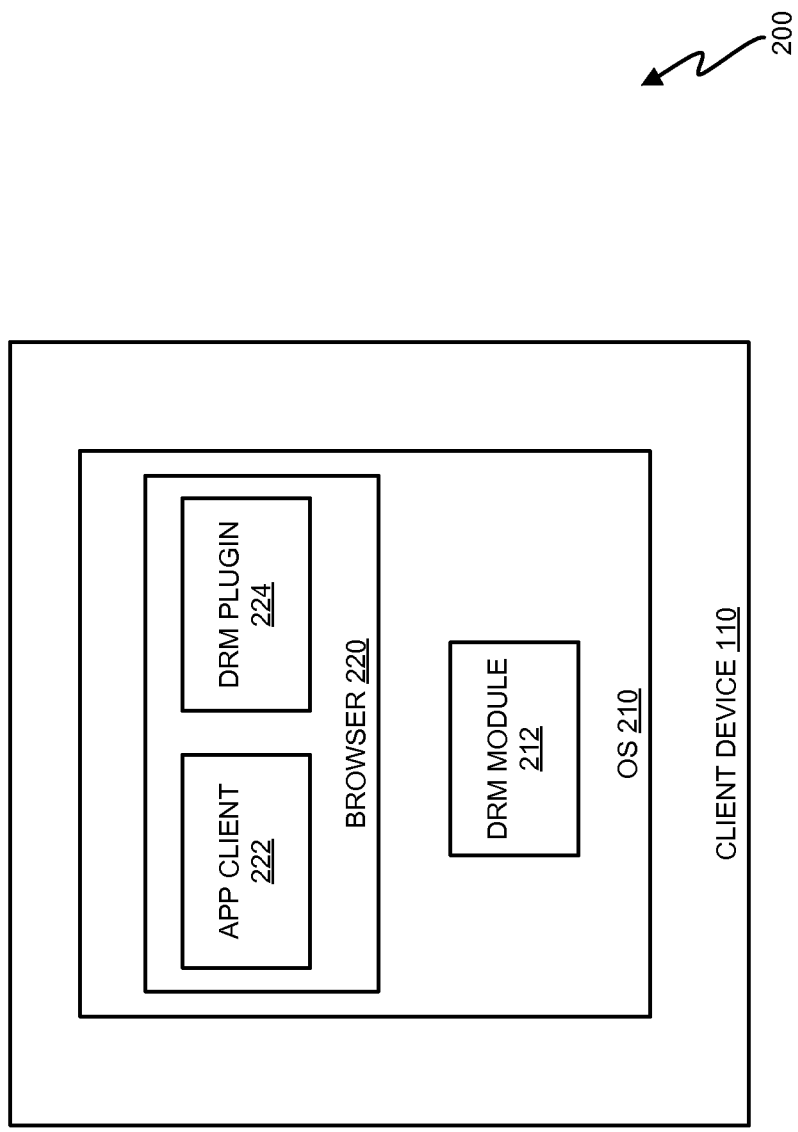
FIG. 2 is a block diagram of components implemented by a processor and memory of an exemplary client device.

FIG. 2 is a block diagram 200 of components implemented by processor 112 and memory 114 of an exemplary client device 110. Block diagram 200 shows an embodiment where the processor and memory of client device 110 implement an Operating System (OS) 210 that directs the overall operations of client device 110 (e.g., an Android OS, iPhone OS, Windows OS, Linux OS, etc.). In this embodiment, DRM module 212 comprises a program operated by OS 210. DRM module 212 is accessed, for example, whenever a browser 220 (e.g., an Internet browser) attempts to utilize an application ("app") client 222 to acquire media online, causing DRM plugin 224 to contact DRM module 212 in order to acquire a signed device ID.

Figure 3:
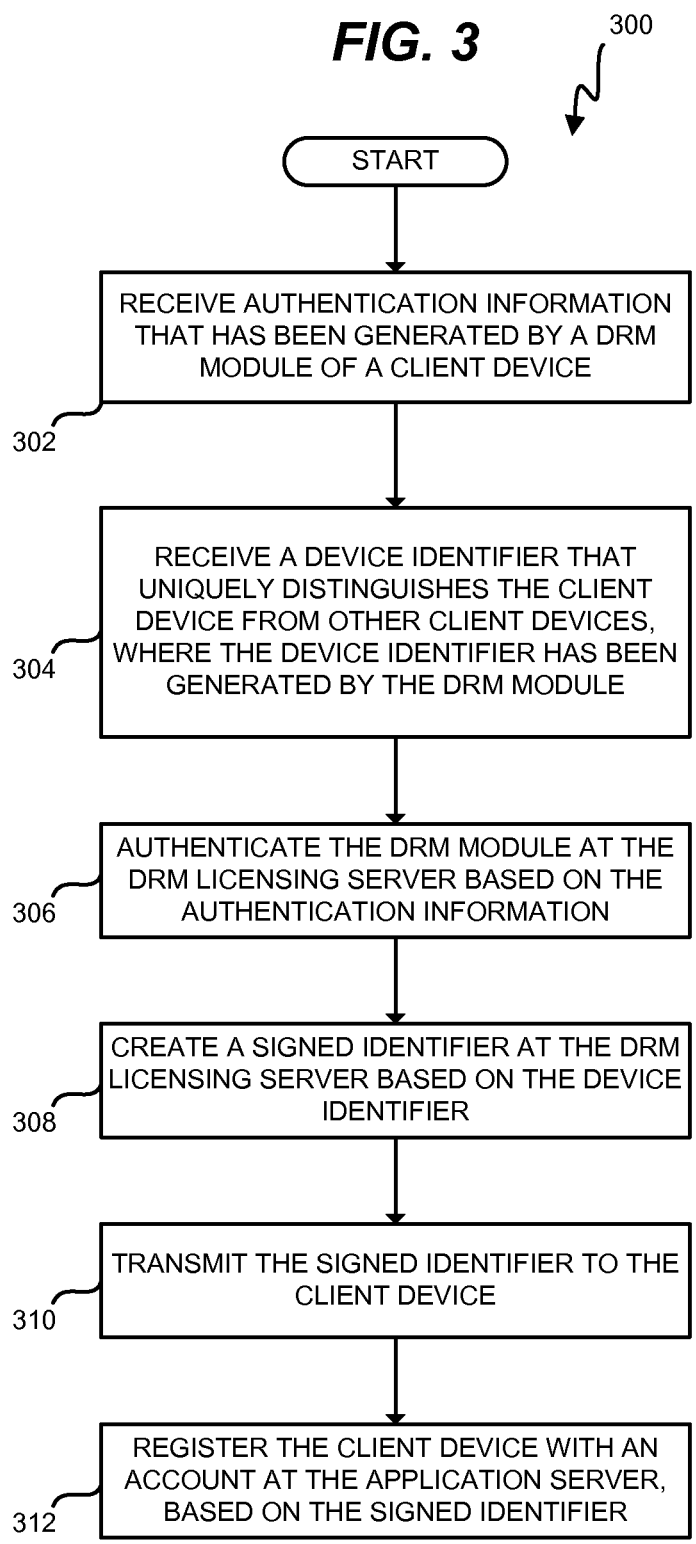
FIG. 3 is a flowchart describing an exemplary method to register a client device by associating the client device with an account for accessing an application server.

FIG. 3 is a flowchart describing an exemplary method to register client device 110 by associating client device 110 with an account at application server 130. Assume, for this embodiment, that a user is operating an application at client device 110 to acquire content from CDN 150 for the first time. For example, the user may utilize an application such as a browser plugin at client device 110 in an attempt to access a service such as Hulu or Netflix.

To initiate the process, client device 110 attempts to acquire a signed device ID from DRM licensing server 140, in order to register client device 110 and associate it with the user's account. Specifically, an application of client device 110 contacts the DRM module, and requests that the DRM module acquire a signed device ID in a secure manner. The DRM module then generates an unsigned device ID that uniquely distinguishes client device 110 from other devices that access application server 130. This unique device ID may be generated based on any suitable technique. For example, the device ID may be generated based on suitable combinations of a Media Access Control (MAC) address of the client device, a unique Central Processing Unit (CPU) ID for the client device, a unique hard disk ID of the client device, a unique Basic Input Output System (BIOS) ID of the client device, a unique Subscriber Identity Module (SIM) card ID for the client device, a unique memory size and/or disk space size of the client device, an account name or code, a user name, etc. The unique, unsigned device ID is more than just an Internet Protocol (IP) address, because IP addresses are interchangeable across devices, and may be spoofed by other devices and/or reassigned.

The DRM module transmits the unsigned device ID via I/F 116 to DRM licensing server 140. The DRM module also transmits authentication information used to verify its identity to DRM licensing server 140. Both the unsigned device ID and the authentication information can be sent via any suitable communication protocol, such as an encrypted and/or proprietary protocol shared by the DRM module 212 and DRM licensing server 140. For example, DRM module 212 and DRM licensing server 140 may utilize Microsoft Silverlight DRM technology, Adobe Flash Player DRM technology, etc.

In step 302, DRM licensing server 140 receives the authentication information, and in step 304, DRM licensing server 140 receives the unsigned device ID. DRM licensing server 140 then utilizes the authentication information to authenticate the DRM module in step 306, confirming that the DRM module merits a signed device ID. Any suitable method may be used to authenticate the DRM module, such as via an encrypted "handshake" or series of queries and responses (e.g., via a proprietary technique used by a DRM system such as Silverlight or Flash). Once the DRM module has been authenticated, in step 308 DRM licensing server 140 creates a signed version of the device ID. In one embodiment, the signed device ID is a JavaScript Object Notation (JSON) Web Token (in accordance with the JSON Web Token and JSON Web Signatures standards) that includes: an issuer claim (iss) indicating the Subject Distinguished Name (Subject DN) for the certificate of DRM licensing server 140 that was used for signing, an issued at (iat) claim indicating a time at which the signature was created, and a device ID claim that matches the device ID provided by client 110. DRM licensing server 140 then transmits the signed device ID to client device 110 in step 310.

At this point, the signed device ID can be transmitted from client device 110 to application server 130, or can be transmitted from DRM licensing server 140 to application server 130. If the signed device ID is transmitted from client device 110, application server 130 verifies the signature from DRM licensing server 140 before registering client device 110 with the account. Alternatively, if the signed device ID is transmitted from DRM licensing server 140, application server 130 can perform a signature-based verification of the signed device ID, or can use other techniques to ensure that the signed device ID came from DRM licensing server 140. In step 312, application server 130 registers client device 110 with an account at application server 130, based on the signed device ID. For example, application server may acquire the device ID from the signed device ID, identify the account based on information within or accompanying the signed device ID, and associate the device ID with the account.

The registration process of method 200 allows application server 130 to use signed device IDs to deny access by devices that are not associated/correlated/registered with a user's account. This reduces the value of stolen credentials, because they cannot be used unless the user's entire device is stolen. Furthermore, because the device registration is performed by a DRM module that is authenticated by a DRM licensing server, the process is secure. This means that a malicious third party cannot fake or manipulate the device-specific ID when contacting application server 130.

Method 300 may be performed once per client device, whenever a period of time passes (e.g., a day, month, hour, etc.), once per session/login by a user, or even each time a client device attempts to access a new piece of content via application server 130.

Even though the steps of method 300 are described with reference to network architecture 100 of FIG. 1, method 300 can be performed in other network architectures and DRM systems as desired (e.g., in any application server context, with or without an associated CDN). The steps of the flowcharts described herein are not all inclusive and can include other steps not shown. The steps described herein can also be performed in an alternative order.

In a further embodiment, application server 130 performs a device authentication process each time an account is used, in order to ensure that a requesting device has been properly registered with the account. This device authentication process may be performed, for example, each time an application at client device 110 establishes a session with CDN 150, each time an application at client device 110 attempts to retrieve new content, once every period of time, once every login/session, etc.

The device authentication process comprises an application at client device 110 sending a request to the DRM module to provide the signed device ID. The DRM module provides the signed device ID to the application, which sends out the signed device ID via I/F 116, potentially along with a set of user credentials. Application server 130 then verifies the signed device ID, and finds an account associated with the device ID indicated by the signed device ID. Then, application server 130 enables access to the account. In one embodiment, enabling access to the account comprises directing CDN 150 to provide requested content. In embodiments where credentials are provided along with the signed device ID, application server 130 further confirms that the credentials match those stored for the account (e.g., by confirming that the user name and password match a version stored in memory).

EXAMPLES

In the following examples, additional processes, systems, and methods are described in the context of registration and authorization of client devices to access a CDN.

Figure 4:
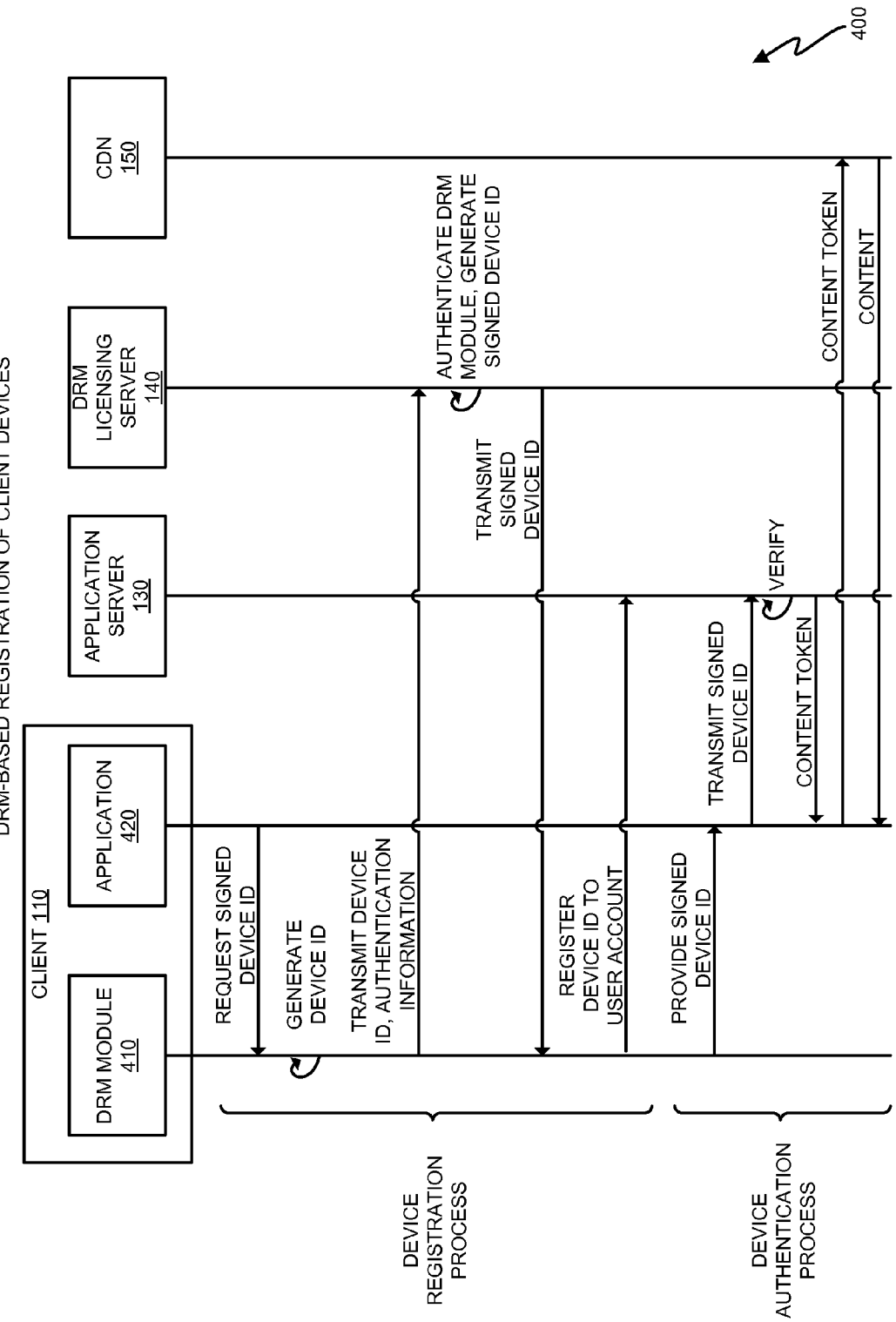
FIGS. 4-5 are message diagrams illustrating exemplary methods for registering and authenticating a client device to access content from a CDN.
Figure 5:
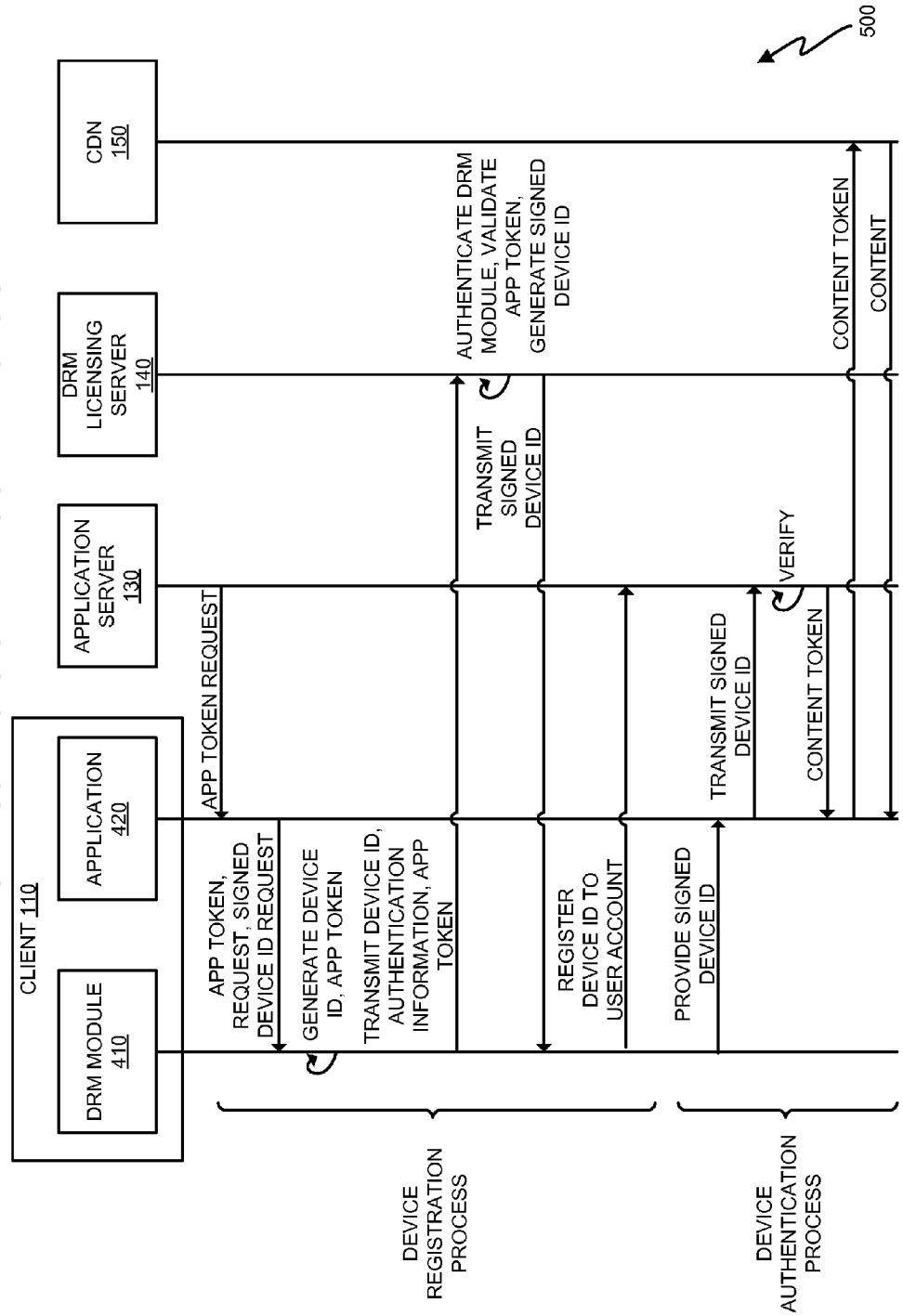

FIGS. 4-5 are message diagrams illustrating exemplary methods for registering and authenticating a client device to access content from a CDN. Specifically, FIG. 4 is a message diagram 400 that illustrates messaging between devices when client 110 is registered and then authenticated in order to retrieve content from CDN 150, while FIG. 5 is a message diagram 500 that illustrates token-based registration and authentication of client devices on an application by application basis.

Assume, for these examples, that client device 110 comprises a smart phone having a processor and memory that implement an operating system, a DRM module/program 410, and a streaming application 420 used to retrieve content. A user starts application 420, and then attempts to log in to an account for application server 130 in order to retrieve content. Application 420 detects that client device 110 is not currently registered with application server 130 and no signed device ID is available. Therefore, according to FIG. 4, application 420 sends a request to DRM module 410 to acquire a signed device ID. DRM module 410 generates a unique, unsigned device ID by appending the account name to the MAC address of client 110, and generates authentication information in accordance with the DRM system used by DRM licensing server 140. The authentication information is proprietary, and the method of transmitting it securely can vary from system to system.

The unsigned ID and the authentication information are then sent from DRM module 410 to licensing server 140. Licensing server 140 uses the authentication information to confirm that DRM module 410 is a trusted component, and then generates a signed device ID by appending an authorization code to the unsigned device ID and encrypting the unsigned device ID. Alternatively, if DRM module 410 has been tampered with, licensing server 140 refrains from generating a signed device ID, terminates further messaging with client device 110, and generates a warning or other notification indicating an unauthorized access attempt relating to this client device/account.

The signed device ID is sent by licensing server 140 to DRM module 410, which forwards the signed device ID to application server 130. Application server 130 then verifies the signature of the signed device ID, and registers client device 110 by adding the device ID (or the signed device ID) to an entry for the account (e.g., by appending the device ID to a list of authorized devices). Client device 110 is now registered with an account at application server 130, which means that the signed device ID may be used by application 420 in order to access an account at application server 130 (thereby allowing client device 110 to acquire content from CDN 150).

In an alternate embodiment, licensing server 140 provides a copy of the signed device ID directly to application server 130, pulls the name of the account from the unsigned device ID, and provides the name of the account to application server 130. Application server 130 then performs registration based upon the signed device ID received from licensing server 140.

The authentication process of FIG. 4 (which may occur each time the account is accessed in order to retrieve content, etc.) begins when DRM module 410 sends the signed device ID to application 420, which transmits the signed device ID to application server 130. Application server 130 verifies the signed device ID based on a certificate from licensing server 140 stored in memory, and then approves the transmission of content from CDN 150 by sending a content token to application 420. Application 420 provides the content token to CDN 150, which sends content to application 420, allowing a user at client device 110 to view the content.

FIG. 5 illustrates similar registration and authentication processes to FIG. 4. However, in FIG. 5, application server 130 initiates the registration process by requesting an application-specific token from application 420. The application token is a string of characters used to distinguish application 420 from other applications that may be attempting to access application server 130. This token is then generated at DRM module 410, and passed to licensing server 140, which generates a signed device ID that includes the token. Thus, the signed device ID is based on the application token as well as the unsigned device ID. This token-based approach allows licensing server 140 to authenticate devices not only on a device-by-device basis, but also on an on an application-by-application basis. Thus, client device 110 may be registered at an application server with respect to some applications, but unregistered with respect to other applications for the same account. Associating the registration with a specific application helps to ensure that licensing server 140 does not generate a universal signed device ID (e.g., a device ID for all applications on client device 110). A universal signed device ID could potentially be used by an unauthorized application to gain access to content via the application server.

Figure 6:
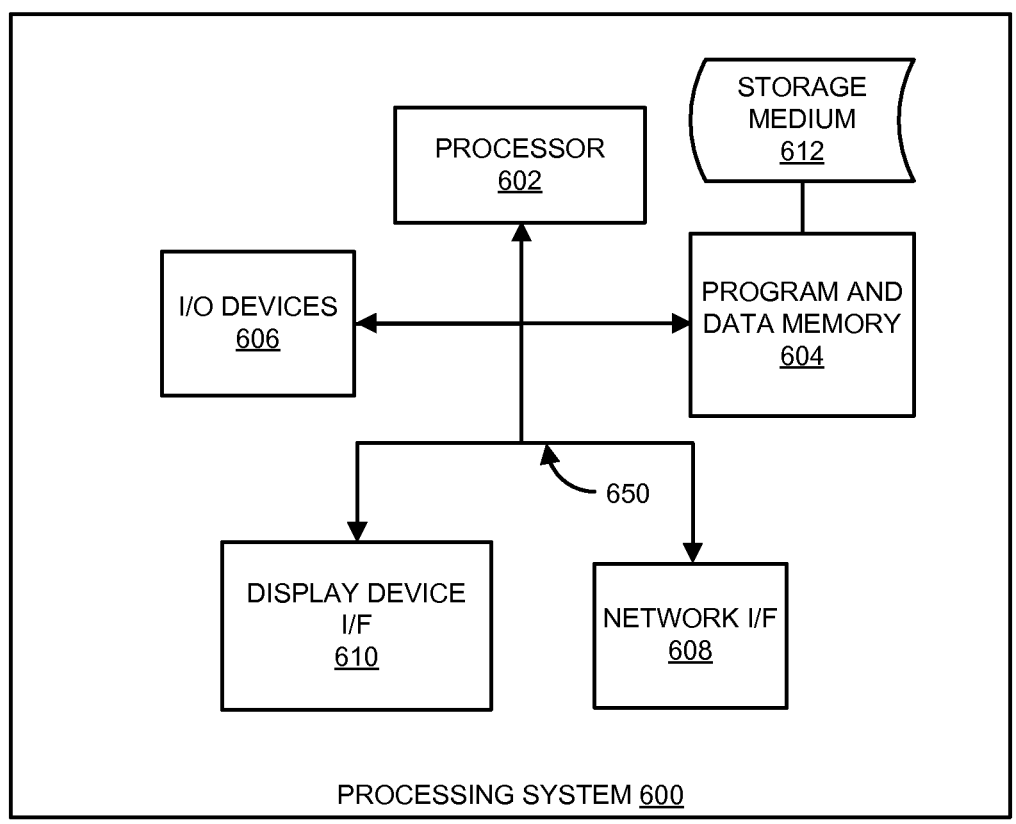
FIG. 6 illustrates an exemplary processing system operable to execute programmed instructions embodied on a computer readable medium.

Embodiments disclosed herein can take the form of software, hardware, firmware, or various combinations thereof In one particular embodiment, software is used to direct a processing system of DRM licensing server 140 and/or client device 110 to perform the various operations disclosed herein. FIG. 6 illustrates an exemplary processing system 600 operable to execute a computer readable medium embodying programmed instructions. Processing system 600 is operable to perform the above operations by executing programmed instructions tangibly embodied on computer readable storage medium 612. In this regard, embodiments of the invention can take the form of a computer program accessible via computer readable medium 612 providing program code for use by a computer (e.g., processing system 600) or any other instruction execution system. For the purposes of this description, computer readable storage medium 612 can be anything that can contain or store the program for use by the computer (e.g., processing system 600).

Computer readable storage medium 612 can be an electronic, magnetic, optical, electromagnetic, infrared, or semiconductor device. Examples of computer readable storage medium 612 include a solid state memory, a magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

Processing system 600, being suitable for storing and/or executing the program code, includes at least one processor 602 coupled to program and data memory 604 through a system bus 650. Program and data memory 604 can include local memory employed during actual execution of the program code, bulk storage, and cache memories that provide temporary storage of at least some program code and/or data in order to reduce the number of times the code and/or data are retrieved from bulk storage during execution.

Input/output or I/O devices 606 (including but not limited to keyboards, displays, pointing devices, etc.) can be coupled either directly or through intervening I/O controllers. Network adapter interfaces 608 can also be integrated with the system to enable processing system 600 to become coupled to other data processing systems or storage devices through intervening private or public networks. Modems, cable modems, IBM Channel attachments, SCSI, Fibre Channel, and Ethernet cards are just a few of the currently available types of network or host interface adapters. Display device interface 610 can be integrated with the system to interface to one or more display devices, such as printing systems and screens for presentation of data generated by processor 602.

What is claimed is:

1. A system comprising:
   a Digital Rights Management (DRM) licensing server operable to receive authentication information generated by a DRM module of a client device, to receive a device identifier that uniquely distinguishes the client device from other client devices, wherein the device identifier has been generated by the DRM module, and to authenticate the DRM module based on the authentication information,
   wherein the DRM licensing server is further operable to create a signed identifier based on the device identifier responsive to authenticating the DRM module, and to transmit the signed identifier to the client device; and
   an application server operable to authenticate the client device by: receiving the signed identifier from the client device, verifying that the signed identifier was generated by the DRM licensing server, identifying an account, and granting the client device access to the application server responsive to identifying the account,
   the application server further operable to register the client device with the account at the application server, based on the signed identifier.

2. The system of claim 1, wherein:
   the DRM licensing server is further operable to create a signed identifier for the client device in response to the passage of a predetermined period of time.

3. The system of claim 1, wherein:
   the application server is further operable to perform the steps of receiving, verifying, identifying, and granting each time the client device attempts to access the application server.

4. The system of claim 1, wherein:
   the DRM licensing server is further operable to facilitate registration of multiple client devices with the account by authenticating DRM modules of the multiple client devices and creating signed identifiers for the multiple client devices, and
   the application server is further operable to register the client devices with the account, based on the signed identifiers.

5. The system of claim 1, wherein:
the DRM licensing server is further operable to create the signed identifier by appending a JavaScript Object Notation (JSON) Web Token signature to the device identifier.

6. The system of claim 1, wherein:
the DRM licensing server receives the authentication information and the device identifier via a proprietary DRM communication protocol.

7. The system of claim 1, wherein:
the device identifier uniquely distinguishes the client device from all other client devices serviced by the application server.

8. A method comprising:
registering a client device with an application server by:
   receiving, at a Digital Rights Management (DRM) licensing server, authentication information generated by a DRM module of the client device;
   receiving, at the DRM licensing server, a device identifier that uniquely distinguishes the client device from other client devices, wherein the device identifier has been generated by the DRM module;
   authenticating the DRM module at the DRM licensing server based on the authentication information;
   creating a signed identifier at the DRM licensing server based on the device identifier, responsive to authenticating the DRM module;
   transmitting the signed identifier to the client device;
   authenticating the client device at the application server by:
     receiving the signed identifier from the client device;
     verifying that the signed identifier was generated by the DRM licensing server;
     identifying an account; and
     granting the client device access to the application server responsive to identifying the account; and
   registering the client device with the account at the application server, based on the signed identifier.

9. The method of claim 8, further comprising:
periodically re eating the method in response to the passage of a predetermined period of time.

10. The method of claim 8, further comprising:
performing the steps of receiving, verifying, identifying, and granting each time the client device attempts to access the application server.

11. The method of claim 8, further comprising:
authenticating DRM modules of multiple client devices;
creating signed identifiers for the multiple client devices, and
registering the multiple client devices with the account, based on the signed identifiers.

12. The method of claim 8, wherein:
creating the signed identifier comprises appending a JavaScript Object Notation (JSON) Web Token signature to the device identifier.

13. The method of claim 8, wherein:
receiving the authentication information and receiving the device identifier is performed via a proprietary DRM communication protocol.

14. The method of claim 8, wherein:
the device identifier uniquely distinguishes the client device from all other client devices serviced by the application server.

15. A non-transitory computer readable medium embodying programmed instructions which, when executed by a processor, are operable for performing a method comprising:
registering a client device with an application server by:
   receiving, at a Digital Rights Management (DRM) licensing server, authentication information generated by a DRM module of the client device;
   receiving, at the DRM licensing server, a device identifier that uniquely distinguishes the client device from other client devices, wherein the device identifier has been generated by the DRM module;
   authenticating the DRM module at the DRM licensing server based on the authentication information;
   creating a signed identifier at the DRM licensing server based on the device identifier, responsive to authenticating the DRM module;
   transmitting the signed identifier to the client device;
   authenticating the client device at the application server by:
     receiving the signed identifier from the client device;
     verifying that the signed identifier was generated by the DRM licensing server;
     identifying an account; and
     granting the client device access to the application server responsive to identifying the account; and
   registering the client device with the account at the application server, based on the signed identifier.

16. The medium of claim 15, wherein the method further comprises:
periodically repeating the method in response to the passage of a predetermined period of time.

17. The medium of claim 15, wherein the method further comprises:
performing the steps of receiving, verifying, identifying, and granting each time the client device attempts to access the application server.

18. The medium of claim 15, wherein the method further comprises:
authenticating DRM modules of multiple client devices;
creating signed identifiers for the multiple client devices, and
registering the multiple client devices with the account, based on the signed identifiers.

19. The medium of claim 15, wherein:
creating the signed identifier comprises appending a JavaScript Object Notation (JSON) Web Token signature to the device identifier.

20. The medium of claim 15, wherein:
receiving the authentication information and receiving the device identifier is performed via a proprietary DRM communication protocol.

\* \* \* \* \*